(12) United States Patent
Chang

(10) Patent No.: US 6,625,377 B2
(45) Date of Patent: Sep. 23, 2003

(54) VARIABLE OPTICAL ATTENUATOR

(75) Inventor: Yao-Hao Chang, Chung-Ho (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 23 days.

(21) Appl. No.: 09/941,444

(22) Filed: Aug. 28, 2001

(65) Prior Publication Data

US 2002/0176685 A1 Nov. 28, 2002

(30) Foreign Application Priority Data

May 23, 2001 (TW) .................................... 90208386 U

(51) Int. Cl.⁷ ................................................ G02B 6/00
(52) U.S. Cl. ...................................................... 385/140
(58) Field of Search ................................... 385/140, 73

(56) References Cited

U.S. PATENT DOCUMENTS 4,702,549 A * 10/1987 Duck et al. ................. 385/140
6,130,984 A * 10/2000 Shen et al. .................. 385/140
6,461,055 B1 * 10/2002 Zimmel ........................ 385/73

* cited by examiner

Primary Examiner—David V. Bruce
Assistant Examiner—Richard Kim
(74) Attorney, Agent, or Firm—Wei Te Chung

(57) ABSTRACT

A variable optical attenuator (10) includes a cover (2), a housing (3), an optical module (4), a reciprocating means (5), a filter (6) and a fixer (7). The filter has a varying optical density gradient and is attached to the reciprocating means. The reciprocating means includes a carrier (53) mounted to a rotatable screw rod (55) and a stopper mechanism (51). When the screw rod is rotated, the carrier with the filter mounted on it moves toward one side of the housing or another. The stopper mechanism halts the carrier ifs side ward movement when it abuts one or another of locating slots (31, 32) of the housing, preventing the filter from moving too far to either side. Optical signals coming from the input optical fiber (45) pass through a collimator (43), through the filter, and are reflected by the reflector (42) to pass again through the filter and collimator for output in the output optical fiber (46).

18 Claims, 6 Drawing Sheets

VARIABLE OPTICAL ATTENUATOR

BACKGROUND OF THE INVENTION

1. Field of the Invention

The present invention relates to a variable optical attenuator for use in optical fiber communication and optical network, and particularly to a variable optical attenuator with a stopper mechanism. A cross reference is shown in the copending application have the same title, the same inventor and the same assignee filed on Aug. 27, 2001 with an unknown serial number.

2. Description of Related Art

An optic attenuator is a passive optical component for reducing optical power propagating in a fiber, and may perform fixed or variable attenuation of optical signal. Optical attenuators are widely used in optical transmission and optical networks.

A general variable optical attenuator comprises a filter. The filter has an effective filter region located in an optical path between a collimator and a reflector. The filter has a filter density which increases from a low density region to a high density region. An optical signal can be attenuated to different extents by transmitting through different region of the filter.

For example, U.S. Pat. No. 4,702,549 describes a variable optical attenuator comprising two optical fibers having ends aligned to each other and a filter element mounted on a reciprocating means for selectively positioning the filter element between the fiber ends. The filter is not perpendicular to the axis of alignment of the fiber ends. The variable attenuator has a manual screw rod to control the attenuation of the transmitted light. A problem with the conventional attenuator is that no stopper is incorporated in the attenuator. Therefore, when the carrier with the optical filter moves between the highest attenuation position and the lowest attenuation position, the user will not know when the filter reaches the highest attenuation position or the lowest attenuation position. As a result, the user will probably over-rotate the screw rod so that the carrier moves beyond either of its extreme points. Therefore, more time will be required to readjust the filter into a desired position. More importantly, the carrier-screw rod interface will wear out more quickly since the carrier will be actuated to repeatedly move beyond the highest attenuation position or the lowest attenuation position. This will affect movement precision of the carrier on the reciprocating means. Devices of U.S. Pat. Nos. 4,989,938 and 4,904,044 share the same problem.

U.S. Pat. Nos. 6,144,794 and 6,130,984 each describe a variable optical attenuator using reciprocating means to adjust the position of the filter. Both devices employ an electrical control system. Although the electrical control systems operate with higher precision, their cost is high and they greatly increase the size of the devices.

The present invention provides a variable optical attenuator comprising a stopper structure for preventing a reciprocating movement means from over movement beyond the highest and lowest attenuation positions.

BRIEF SUMMARY OF THE INVENTION

An object of the present invention is to provide an improved variable optical attenuator having a stopper mechanism for preventing the filter from moving beyond end-point positions.

Another object of the present invention is to provide an improved variable optical attenuator which can be conveniently adjusted in a relatively small and effective range.

Another object of the present invention is to provide an improved variable optical attenuator in which a carrier-screw rod interface is protected from wearing too quickly to ensure precise movement of the carrier.

A variable optical attenuator of the present invention comprises a housing to which a cover is attached for defining an interior space forming an inner cavity in a lower portion of the housing. A pair of locating slots is defined in opposite lateral sides of the inner cavity. An inner sidewall forms a forward boundary of the inner cavity. A side hole communicates between one of the locating slots and an outside wall of the housing. A fixing groove and a supporting portion are formed adjacent the other locating slot.

An optical module is accommodated in the interior space and comprises a frame, a reflector and a collimator. The frame has a groove with an inner wall, and a through hole communicating with the groove. The reflector is fixed on the inner wall of the frame and is disposed coaxially with the through hole. The collimator is positioned in the through hole and fixes ends of an input optical fiber for carrying the transmission optical signals to the attenuator and an output optical fiber for receiving the resulting attenuated transmission optical signals from the attenuator.

The reciprocating means is accommodated in the inner cavity and comprises a carrier for carrying a filter, a stopper mechanism, a stability mechanism, and a screw rod. The stopper mechanism comprises two stopper blocks and a stopper body. The stability mechanism has a fixing portion for being fixed to the carrier and a mating portion for contacting the housing. The screw rod has a threaded portion at its middle and a holding portion at each end.

When assembled, the carrier moves lengthwise along the screw rod when the screw rod is rotated. The filter that is fixed to the carrier moves along with the carrier. The stopper mechanism is formed around three sidewalls of the carrier. The stability mechanism is mounted on the carrier. The fixing portion of the stability mechanism is inserted into a fixing groove of the carrier. The mating portion of the stability mechanism abuts against the inner sidewall and moves along the inner sidewall when the carrier is moved.

By rotating the screw rod first in one direction and then in the reverse direction, the carrier with the filter can be made to move first toward one side and then toward another side of the housing. The direction of movement of the filter is perpendicular to the path of the input and output light. The filter has a filter density which varies between a low density region and a high density region along a filter axis. When the carrier arrives at one end of the screw rod, the stopper abuts with surfaces of the corresponding locating slot and the part of the filter penetrated by the input and output light will be either the low density region or the high density region. During rotation of the screw rod, the stability mechanism prevents the carrier from rotating with the screw rod and provides for stable movement of the filter, thereby ensuring precision adjustment of attenuation of optical signals.

Other objects, advantages and novel features of the invention will become more apparent from the following detailed description when taken in conjunction with the accompanying drawings, wherein.

DETAILED DESCRIPTION OF THE INVENTION

Figure 1:
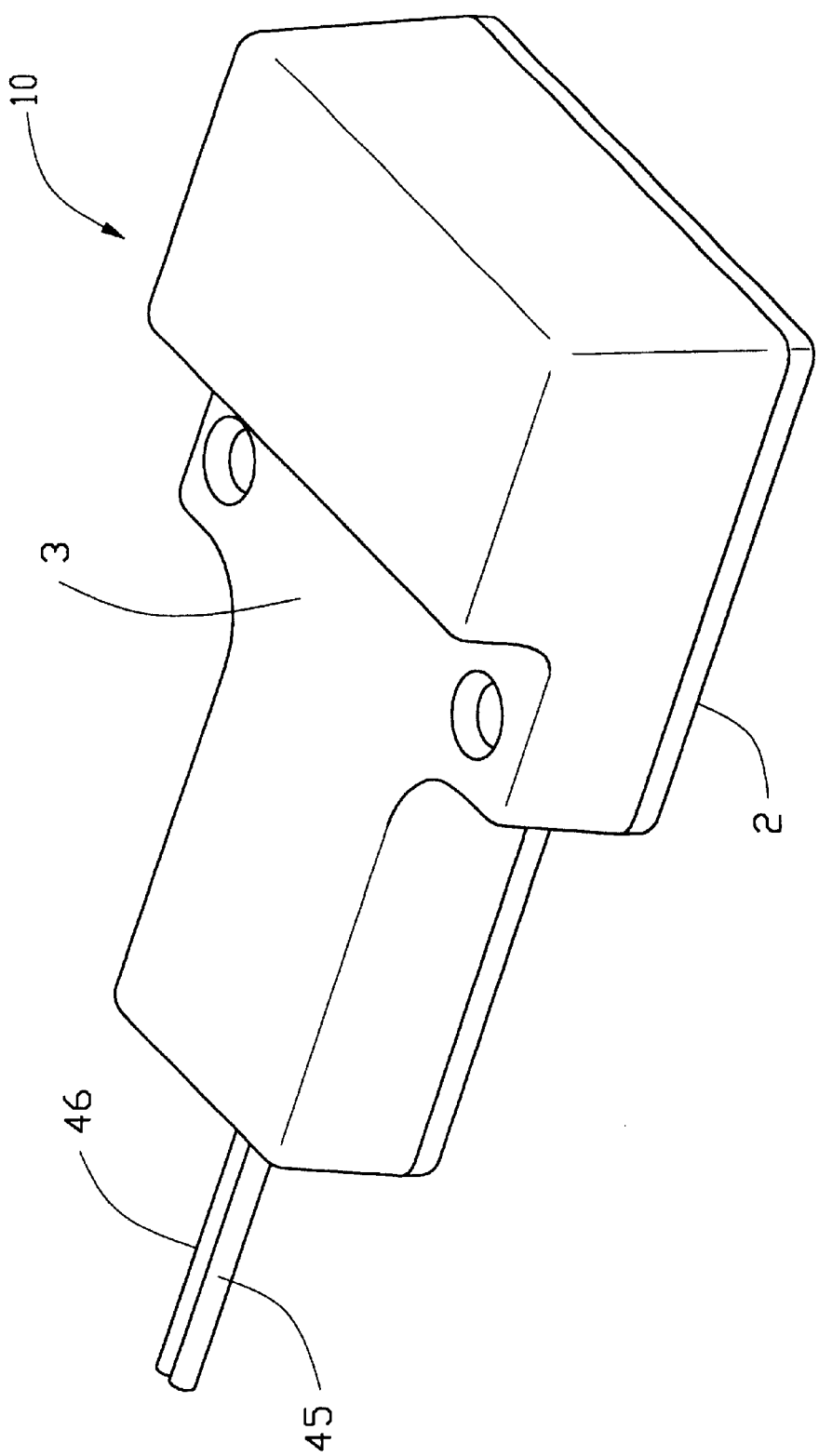
FIG. 1 is a perspective, up-side-down, assembled view of a variable optical attenuator of the present invention.
Figure 2:
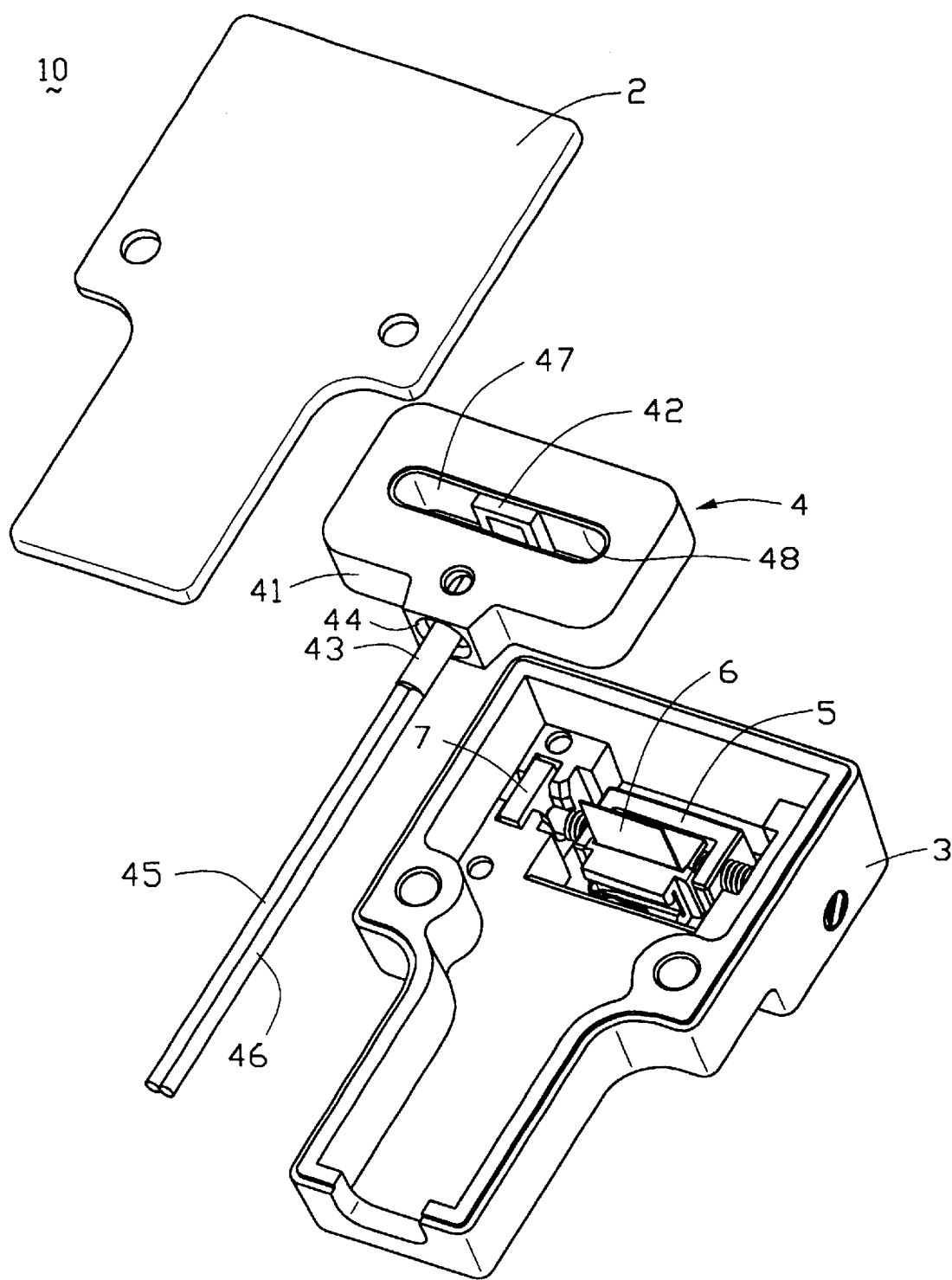
FIG. 2 is an exploded view of the variable optical attenuator of the prevent invention.
Figure 3:
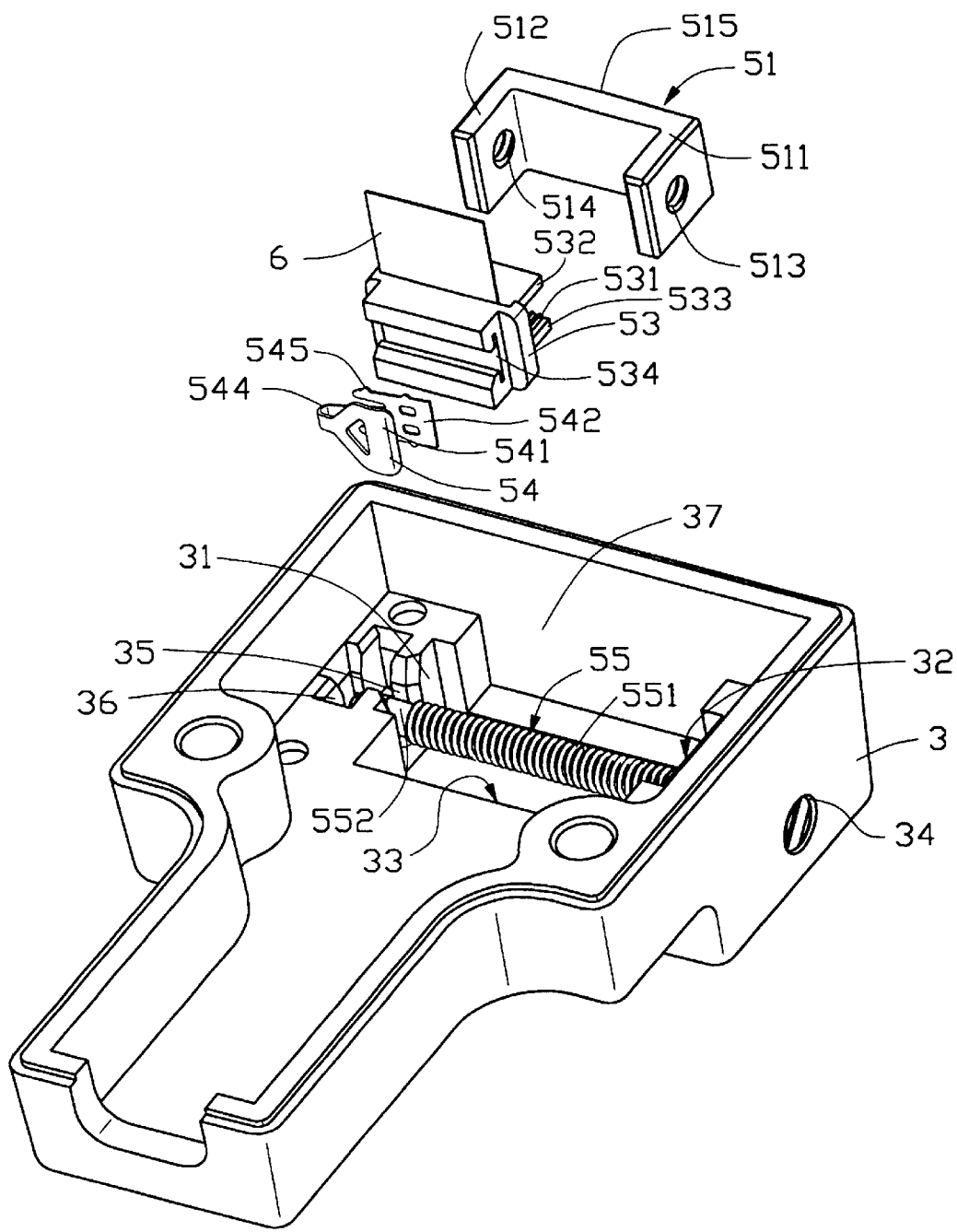
FIG. 3 is a partially exploded detail of FIG. 2, without an optical module or a cover.

As shown in FIGS. 1–3, a variable optical attenuator 10 of the present invention comprises a cover 2, a housing 3, an optical module 4, a reciprocating means 5, a filter 6 and a fixer 7. The housing 3 has an inner cavity 37 and a pair of locating slots 31, 32 positioned at each side of and communicating with the inner cavity 37. An inner sidewall 33 defines a front wall of the inner cavity 37. A side hole 34 is positioned at one side (not labeled) of the inner cavity 37 and communicates between the inner cavity 37 and an outer side of the housing 3. A fixing groove 36 is separated from the inner cavity 37 by two halves of a supporting portion 35, which are formed at a second side (not labeled) of the inner cavity 37. The fixing groove 36 communicates with the inner cavity 37 via a passageway (not labeled) defined between the two halves of the supporting portion 35.

The optical module 4 comprises a frame 41, a reflector 42 and a collimator 43. The frame 41 has a groove 47 defined through a middle thereof between an upper side (not labeled) and a lower side (not labeled) of the frame 41. An inner wall 48 defines a rear side (not labeled) of the groove 47. A through hole 44 is defined from a front side (not labeled) of the frame 41 to the groove 47. The reflector 42 is fixed to the inner wall 48 of the frame 41 and is disposed coaxially with the through hole 44. An input optical fiber 45 and an output optical fiber 46 are fixed to the collimator 43, which is fixed in the through hole 44.

The reciprocating means 5 for moving the variable optical filter 6 comprises a carrier 53, a stability mechanism 54, a stopper mechanism 51, and a screw rod 55. The carrier 53 carries the filter 6 and is mounted on the screw rod 55. The carrier 53 has a lower plate 533 and an upper plate 532 extending rearward. A fixing groove 534 is defined in a forward surface of the carrier 53. Teeth 531 are formed on an upper surface of the lower plate 533 and a lower surface of the upper plate 532. The stopper mechanism 51 comprises a stopper body 515, a first stopper block 511, and a second stopper block 512. Each stopper block 511, 512 has a screw hole 513, 514. The stopper mechanism 51 is used to prevent the carrier 53 from moving too far to either side of the screw rod 55. The stability mechanism 54 can be, for instance, a spring member. The stability mechanism 54 has a mating portion 541, a fixing portion 542, and a resilient connecting portion 544 between the mating and fixing portions 541, 542. The fixing portion 542 has a plurality of teeth 545. The screw rod 55 has a threaded portion 551 formed along a middle portion thereof and a holding portion 552 at each end thereof.

The filter 6 has a varying optical density gradient along at least one of its dimensions. The filter density varies between a low density region and a high density region along a linear filter axis parallel to a movement path of the filter.

In assembly, the stopper mechanism 51 is positioned around three sides of the carrier 53. The screw rod 55 is threadedly engaged with and extends through the first screw hole 513, between the lower plate 533 and the upper plate 532, and through the second screw hole 514. In this condition, the threaded portion 551 engages with the teeth 531 of the upper and lower plates 532, 533 of the carrier, and with threads in the screw holes 513, 514 of the stopper mechanism 51. The filter 6 is fixed onto the carrier 53. The fixing portion 542 of the stability mechanism 54 is inserted into the fixing groove 534 50 that the teeth 545 have an interferential fit with the fixing groove 534. One holding portion 552 of the screw rod 55 is inserted into the side hole 34 of the housing 3. The other holding portion 552 is disposed in the passageway (not labeled) between the two halves of the supporting portion 35 and extends into the fixing groove 36. The carrier 53 is thereby positioned within the inner cavity 37 and the mating portion 541 of the stability mechanism 54 resiliently presses against the inner sidewall 33 of the housing 3. The matins portion 541 moves along the inner sidewall 33 when the carrier 53 moves. The fixer 7 is then assembled in the fixing groove 36, positioned on the holding portion 552 of the screw rod 55, so the screw rod 55 is stably fixed. The screw rod 55 is rotatable about a longitudinal axis thereof The optical module 4 is assembled in the housing 3 with the filter 6 protruding into the groove 47 in front of the reflector 42. The input optical fiber 45 and output optical fiber 46 protrude from a front end of the housing 3. The cover 2 is fixed the optical signal with the variable optical filter moves between the low density region and the high density region along the filter axis.

Figure 4:
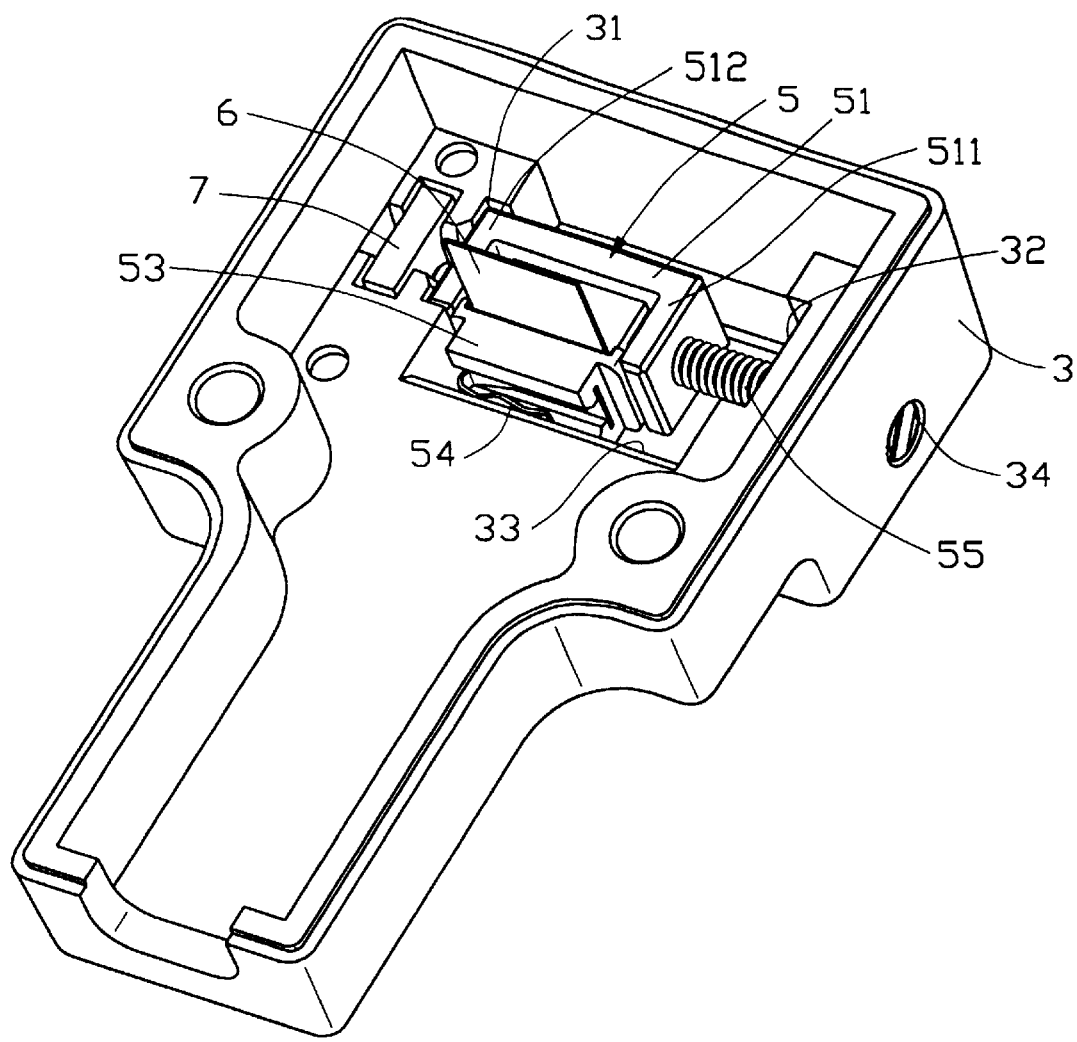
FIG. 4 is an assembled view of FIG. 3 in a first position.
Figure 5:
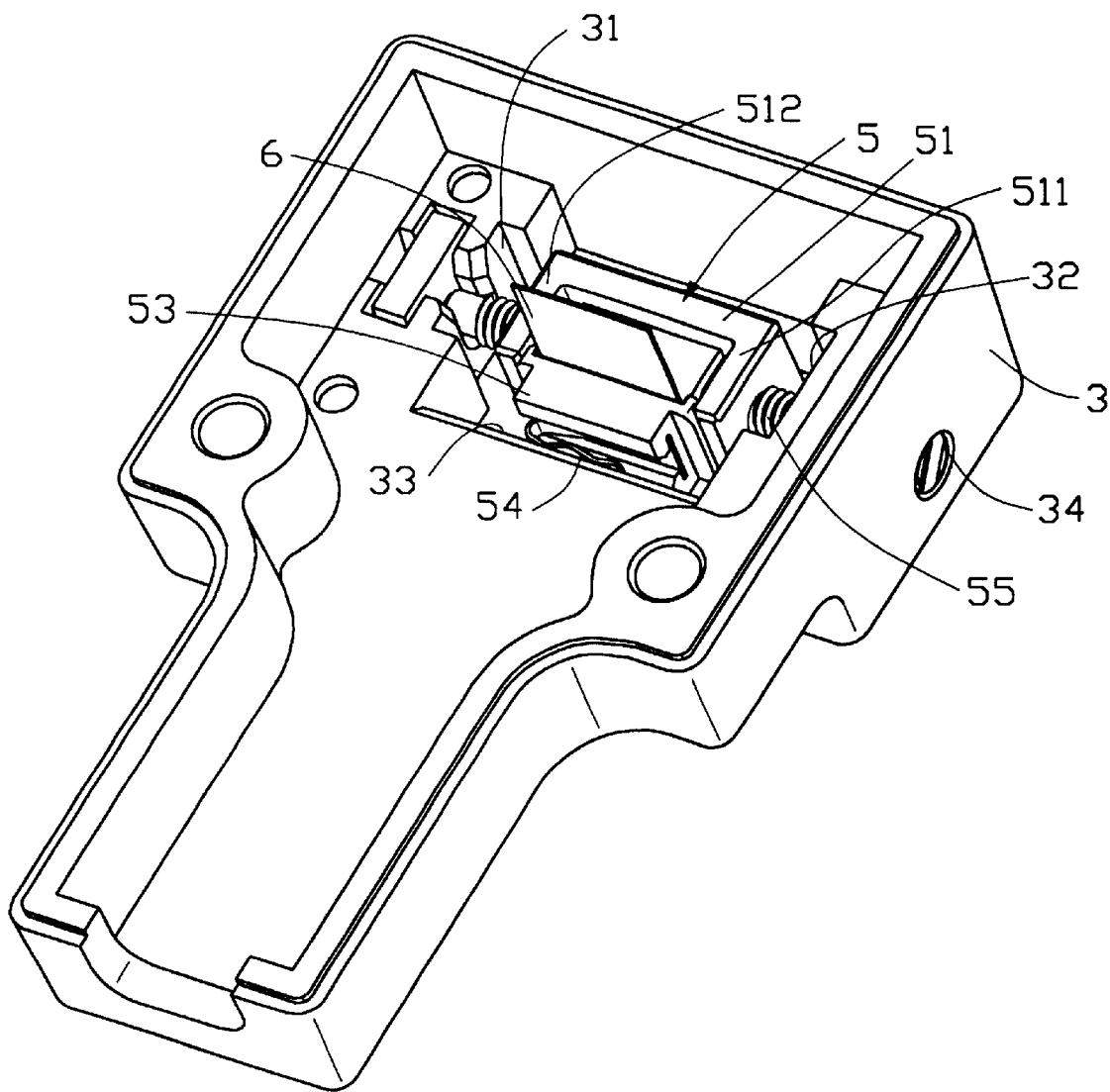
FIG. 5 is an assembled view of FIG. 3 in a second position.
Figure 6:
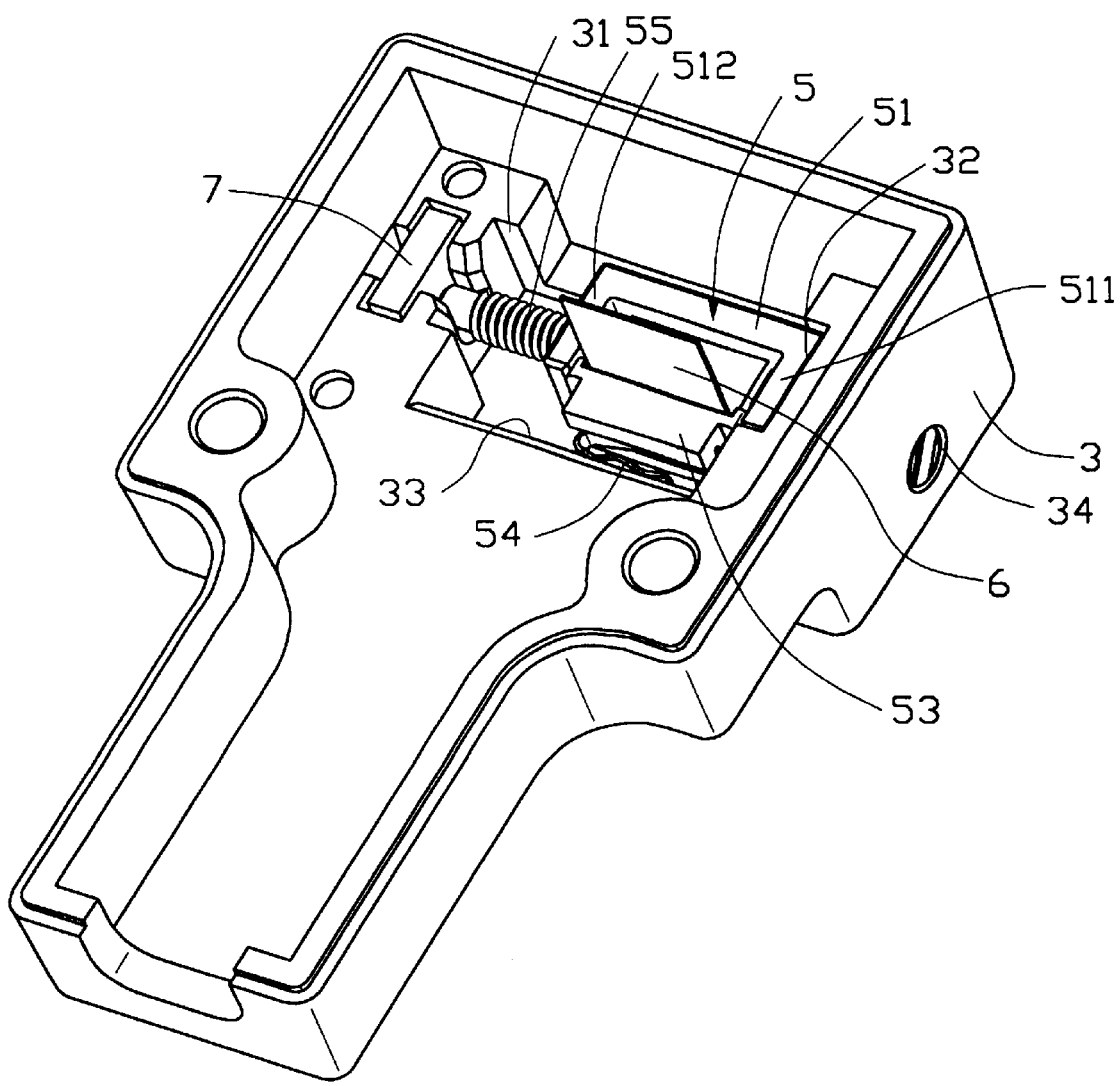
FIG. 6 is an assembled view of FIG. 3 in a third position.

Referring to FIGS. 4–6, in use, optical signals are transmitted from the input optical fiber 45 through the collimator 43 and through the groove 47 to pass through the filter 6. These optical signals are reflected by the reflector 42, and pass again through the filter 6 and the collimator 43, in a reverse direction, and are transmitted through the output optical fiber 46. When the screw rod 55 is rotated in one direction, the reciprocating means 5 and the filter 6 move toward the locating slot 32. When the screw rod 55 is rotated in an opposite direction, the reciprocating means 5 and the filter 6 move toward the locating slot 31. The direction of movement of the filter 6 is perpendicular to the path of the input and output optical signals. The filter 6 has an optical density gradient which varies between a lower density region and a higher density region along a direction parallel to the direction of movement of the filter. When the carrier 53 moves to either end of the screw rod 55, a stopper block 511, 512 of the stopper mechanism 51 abuts against the surface of a locating slot 32, 31 respectively. When the stopper block 511 abuts an outside surface of the locating slot 32, or the other stopper block 512 abuts an outside surface of the locating slot 31, the filter 6 penetrated by the input and output optical signals stops its motion.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A variable optical attenuator for attenuating optical signals input from an input fiber and output to an output fiber, comprising:

a variable optical filter having a filter density gradient varying between a low density region and a high density region along a filter axis, parallel to a movement path of the filter, the movement path of the filter being perpendicular to the axis of the input fiber and the output fiber;

a reciprocating means to which the variable optical filter is mounted, the reciprocating means providing a movement of the variable optical filter along the movement path of the filter, the reciprocating means having a stopper mechanism to prevent the reciprocating means from moving the filter beyond a predetermined extreme point; and a housing being adapted to accommodate said variable optical filter and said reciprocating means, and the housing having locating means for preventing the stopper mechanism from farther moving, the locating means of the housing defining a predetermined space;

wherein when the variable optical filter with the stopper mechanism moves in the predetermined space along the movement path of the filter, an intersection point of the optical signal with the variable optical filter moves between the low density region and the high density region along the filter axis.

2. The variable optical attenuator as claimed in claim 1 further comprising an optical module, the optical module comprising a frame.

3. The variable optical attenuator as claimed in claim 2, wherein the frame has a groove defined through at least one side of the frame and a through hole defined through another side of the frame and in communication with the groove.

4. The variable optical attenuator as claimed in claim 3 further comprising a collimator, the collimator fixing ends of the input fiber and the output fiber and being positioned in the through hole.

5. The variable optical attenuator as claimed in claim 4 further comprising a reflector fixed to an inner wall of the groove opposite to and substantially normal to an axis of the collimator.

6. The variable optical attenuator as claimed in claim 5, wherein the filter is positioned between the reflector and the collimator.

7. The variable optical attenuator as claimed in claim 1, wherein the carrier threadingly engages a screw rod for being driven along the movement path, a stability mechanism being attached to the carrier for preventing rotation of the carrier.

8. The variable optical attenuator as claimed in claim 7 further comprising a fixer for fixing the screw rod in place within the housing.

9. The variable optical attenuator as claimed in claim 1, wherein the stopper has a stopper body and two stopper blocks.

10. The variable optical attenuator as claimed in claim 7, wherein the stopper mechanism is formed around three sidewall of the carrier.

11. A variable optical attenuator for attenuating optical signals input from an input fiber and output to an output fiber, comprising:

a variable optical filter having a filter density gradient varying between a low density region and a high density region along a filter axis, parallel to a movement path of the filter, the movement path of the filter being perpendicular to the axis of the input fiber and the output fiber;

a reciprocating means defining a carrier to which the variable optical filter is mounted, the reciprocating means providing a movement of the variable optical filter along the movement path of the filter;

a stopper mechanism, engaging with the carrier but being not integrally formed with the carrier, preventing the reciprocating means from moving the filter beyond a predetermined extreme point; and a housing being adapted to accommodate said variable optical filter, said stopper mechanism and said reciprocating means, and the housing having locating means for preventing the stopper mechanism from further moving, the locating means of the housing defining a predetermined space;

wherein when the variable optical filter with the stopper mechanism moves in the predetermined space along the movement path of the filter, an intersection point of the optical signal with the variable optical filter moves between the low density region and the high density region along the filter axis.

12. A variable optical attenuator for attenuating optical signals input from an input fiber and output to an output fiber, comprising:

a variable optical filter having a filter density gradient varying between a low density region and a high density region along a filter axis, parallel to a movement path of the filter, the variable optical filter being moveably positioned in the path defined between the input fiber and the output fiber;

a reciprocating means defining a screw element and a carrier to which the variable optical filter is mounted, the reciprocating means providing a movement of the variable optical filter along the movement path of the filter, the reciprocating means further comprising a stopper mechanism, being not integrally formed with the carrier but with portions located at two opposite ends of said carrier along a direction of the movement path of the filter, to prevent the reciprocating means from moving the filter beyond a predetermined extreme point; and a housing being adapted to accommodate said variable optical filter, said stopper mechanism and said reciprocating means, and the housing having locating means for preventing the stopper mechanism from further movement in a given direction along the movement path of the filter, the locating means of the housing defining a predetermined space;

wherein when the variable optical filter with the stopper mechanism moves in the predetermined space along the movement path of the filter, an intersection point of the optical signal with the variable optical filter moves between the low density region and the high density region along the filter axis.

13. The variable optical attenuator as claimed in claim 12, wherein the locating means comprises a supporting portion and a first inner side of the housing.

14. The variable optical attenuator as claimed in claim 13, wherein the supporting portion is formed adjacent a second inner side of the housing opposite the first inner side of the housing.

15. The variable optical attenuator as claimed in claim 14, wherein the screw element has threads on a surface thereof, and the stopper mechanism threadedly engages with the screw element.

16. The variable optical attenuator as claimed in claim 15, wherein a fixing groove is defined between the supporting portion and the second inner side of the housing to accept a holding portion of the screw element.

17. The variable optical attenuator as claimed in claim 16, wherein the stopper mechanism comprises a first stopper block, a second stopper block and a stopper body connected therebetween.

18. The variable optical attenuator as claimed in claim 17, wherein each stopper block defines a screw hole.

* * * * *